United States Patent [19]
Andrews

[11] Patent Number: 5,299,384
[45] Date of Patent: Apr. 5, 1994

[54] SELF-DRAINING PLANTER

[76] Inventor: Dean D. Andrews, 11817 W. 149th St., Olathe, Kans. 66062

[21] Appl. No.: 959,693

[22] Filed: Oct. 13, 1992

Related U.S. Application Data

[63] Continuation-in-part of Ser. No. 785,514, Oct. 31, 1991, abandoned.

[51] Int. Cl.$^5$ .............................................. A01G 9/02
[52] U.S. Cl. ............................................ 47/66; 47/79
[58] Field of Search ........................... 47/66, 66 D, 79

[56] References Cited

U.S. PATENT DOCUMENTS

| | | |
|---|---|---|
| 187,771 | 2/1877 | Piaget . |
| 812,806 | 2/1906 | Bixler . |
| 1,116,227 | 11/1914 | Bolger . |
| 1,129,554 | 2/1915 | Courtney . |
| 1,293,785 | 2/1919 | Hurst . |
| 1,690,910 | 10/1927 | Shapiro . |
| 2,491,124 | 12/1949 | Martin ........................................ 47/81 |
| 2,782,562 | 2/1957 | Watkins .................................... 47/79 |
| 3,106,043 | 10/1963 | Ferrand ..................................... 47/81 |
| 3,121,975 | 2/1964 | Duhamel .................................. 47/69 |
| 3,606,697 | 9/1971 | Eden ......................................... 47/69 |
| 4,285,164 | 8/1981 | Moore ....................................... 47/69 |
| 4,553,352 | 11/1985 | Powell et al. . |
| 5,209,015 | 5/1993 | De Filippi ............................. 47/79 C |

FOREIGN PATENT DOCUMENTS 425005 5/1991 Netherlands .

*Primary Examiner*—Ramon S. Britts
*Assistant Examiner*—Joanne C. Downs
*Attorney, Agent, or Firm*—Litman, McMahon & Brown

[57] ABSTRACT

A self-draining planter includes a container body with a container body sidewall having an opening. The sidewalls partially enclose an upwardly-open container body interior. A filter assembly includes inner and outer ends, a tubular member with inner and outer ends, a coupling mounted on the tubular member outer end and a screen wrapped around the tubular member with fluid passages therethrough. The tubular member inner end is closed and the tubular member includes a bore and a tube wall with tubular member openings communicating with its bore. The coupling extends through the container sidewall opening and is adjustably mounted on the container sidewall in disposition such that water is drained to a preselected level within the receptacle. The coupling includes a coupling bore communicating with the tubular member bore and open at the filter assembly outer end.

11 Claims, 2 Drawing Sheets

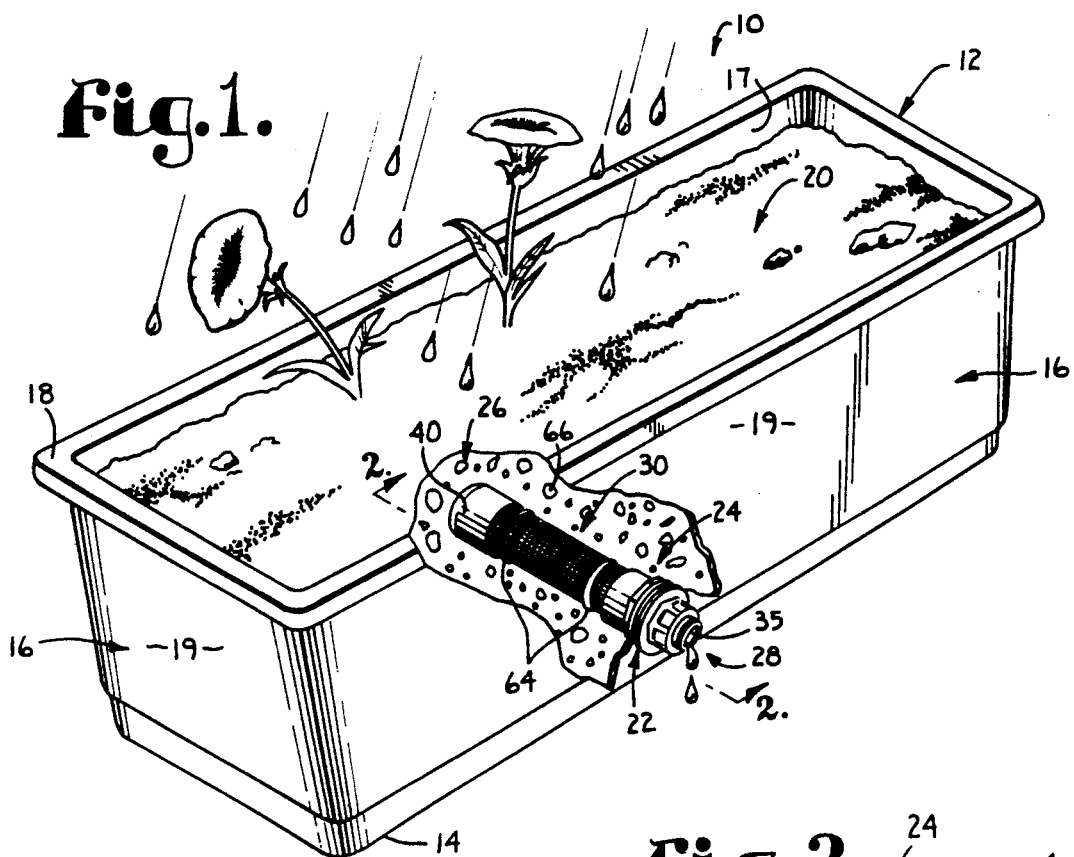
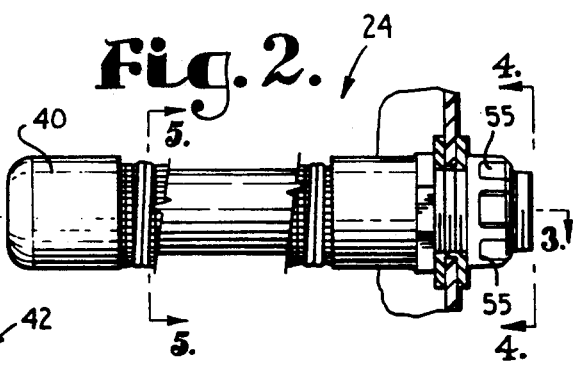
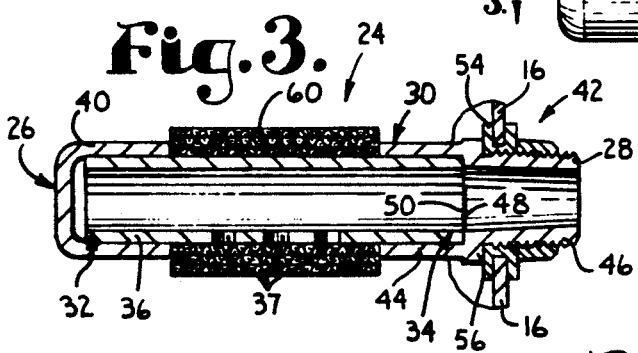
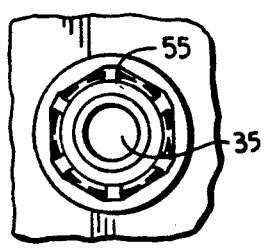
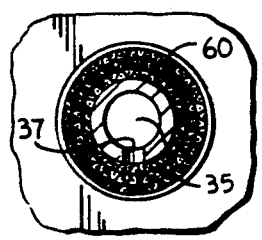

SELF-DRAINING PLANTER

This is a continuation-in-part of application Ser. No. 07/785,514 filed Oct. 31, 1991, now abandoned.

BACKGROUND OF THE INVENTION

1. Field of the Invention

The present invention relates generally to planters, and in particular to a planter container with a drain assembly.

2. Description of the Related Art

Various types of containers have heretofore been utilized for growing various plants. It is often desirable to provide such containers with drainage systems, such as openings in their lower parts, for discharging excessive water. Such drainage systems can be desirable because excessive moisture levels in the potting soil can cause the plant roots to rot and can otherwise be harmful to the plants.

Providing for the passage of water through a planter container and out of a drainage system can also have a beneficial effect of removing bacteria and contaminants from the soil. Flower pots have heretofore been provided with drainage systems which consist of simple openings in the flower pot bottoms or sidewall openings in proximity to the flower pot bottoms.

However, a problem with such openings is that the potting soil is often washed out with the drain water. Flower pots and other types of planters have heretofore been provided with gravel and other material which is coarser than potting soil to facilitate drainage. However, the potting soil can wash through such relatively coarse material, particularly after a relatively heavy watering or rainfall.

An additional problem with such prior art drainage systems is that they are not adjustable. That is to say, they do not provide for control of the drainage level, but instead provide for complete drainage of the soil to a preset level, generally at the bottom of the container. For certain types of plants, it is desirable to maintain a certain level of wetness around the lower roots. For other types of plants, complete drainage is required to avoid root rot.

Therefore, for many applications it would be desirable to provide a planter with an adjustable drainage system incorporating a filter to pass liquids therethrough while blocking the flow of solids and particulates, such as top soil. Heretofore there has not been available a self-draining planter with the advantages and features of the present invention.

SUMMARY OF THE INVENTION

In the practice of the present invention, a self-draining planter is provided which includes a container body with a sidewall and a bottom wall partially enclosing an upwardly-open receptacle. The sidewall includes interior and exterior surfaces and a sidewall opening extending therebetween. A filter assembly includes inner and outer ends, an L-shaped tubular member with inner and outer portions and inner and outer ends, an end cap mounted on the tubular member inner end, a coupling mounted on the tubular member outer end and a filter screen wrapped around the inner portion of the tubular member adjacent the inner end. The tubular member includes a bore extending between its ends and a plurality of tubular member openings communicating with the bore. The filter includes fluid passages fluidically communicating with the tubular member openings. The coupling extends through the container body sidewall opening and is retained in place by a nut threadably received on a male-threaded section of the coupling whereby the filter assembly is mounted on the container body sidewall and projects into the receptacle thereof.

OBJECTS AND ADVANTAGES OF THE INVENTION

The principle objects and advantages of the present invention include: providing a self-draining planter; providing a draining system; providing a draining system for flower pots, flower boxes and other planters; providing such a draining system which passes fluids and retains some solid and particulate matter; providing such a system which can drain excess water from a planter; providing such a system which can retain top soil in a planter; providing such a system in which the drainage level is adjustable; providing such a system which is adaptable to various types of planters; providing such a system which can be provided in various sizes; providing such a system which utilizes a screen which can comprise various materials and which can be wrapped in multiple layers; providing such a system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an upper, front, left side perspective view of a self-draining planter embodying the present invention.

FIG. 2 is an enlarged, fragmentary, front-to-back cross-sectional view of the planter, particularly showing a drainage system thereof and taken generally along line 2—2 in FIG. 1.

FIG. 3 is an enlarged, fragmentary, horizontal, cross-sectional view of the planter, particularly showing the drainage system thereof and taken generally along line 3—3 in FIG. 2.

FIG. 4 is an enlarged, fragmentary, front elevational view of the planter, particularly showing the front of the drainage system thereof and taken generally along line 4—4 in FIG. 2.

FIG. 5 is an enlarged, fragmentary, vertical, cross-sectional view of the planter, particularly showing the drainage system thereof and taken generally along line 5—5 in FIG. 2.

DETAILED DESCRIPTION OF THE PREFERRED EMBODIMENTS

Figure 6:
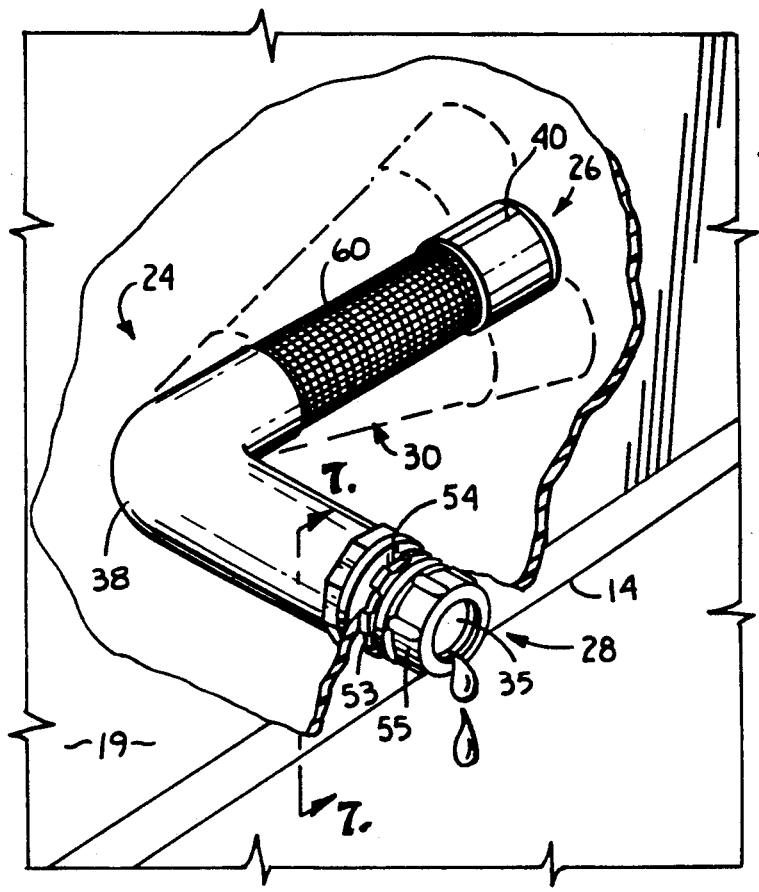
FIG. 6 is an enlarged, fragmentary, perspective view of a portion of the planter depicted in FIG. 1, particularly showing an embodiment of the drainage system having an adjustable drainage level.
Figure 7:
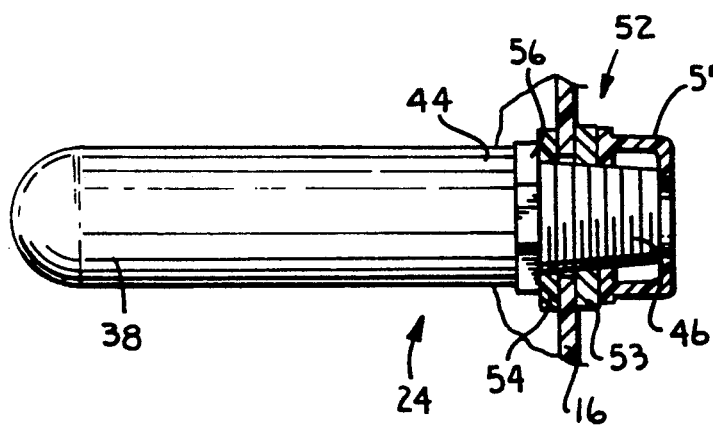
FIG. 7 is an enlarged, fragmentary, horizontal, cross-sectional view of the planter, particularly showing the adjustable drainage system depicted in FIG. 6, and taken generally along line 7—7 in FIG. 6.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Introduction and Environment

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference 10 generally designates a self-draining planter embodying the present invention. The term "planter" as used herein, broadly encompasses containers of various configurations, including flower pots, planter boxes, etc., for receiving, displaying, shipping and growing plants and vegetation of various types.

II. Container or Planter Body 12

Without limitation on the generality of useful applications of the self-draining planter 10, the disclosed embodiment of the present invention includes a container or planter body 12 with the general configuration of a planter box having a bottom wall 14, sidewall means (e.g., four sidewalls which can be slightly tapered to permit the container bodies 12 to be nested) 16, an upper rim 18 and a container receptacle or interior 20 at least partially enclosed by the bottom wall 14 and the sidewall means 16. The sidewall means 16 includes inner (interior) and outer (exterior) surfaces 17, 19 and a sidewall opening 22, which can be located slightly above the bottom wall 14.

The self-draining planter 10 generally comprises a container body 12 and a filter or drain assembly 24.

III. Filter or Drain Assembly 24

The filter assembly 24 includes inner and outer ends 26, 28 and a tubular member 30. The tubular member 30 includes inner and outer ends 32, 34 and a tubular member throughbore 35 extending therebetween. The tubular member 30 includes a generally cylindrical tube wall 36 with a plurality (e.g., three are shown) of tubular member openings 37 which are generally longitudinally aligned along an underside of the tubular member 30 and open the tubular member throughbore 35 downwardly. In certain embodiments as best shown in FIG. 6, tube wall 36 includes an elbow portion 38 to impart a generally L-shaped configuration to drain assembly 24. Also in this embodiment, tube openings 37 may be aligned in pairs on opposed sides of tube wall 36 to provide a total of 6 such openings. Those skilled in the art will appreciate that 2,4,8 or any number of openings may be provided as desired.

An end cap 40 is secured to and encloses the tubular member inner end 32. A coupling 42 includes an inner socket section 44, an outer, male-threaded section 46 and a coupling throughbore 48 extending between the coupling sections 44, 46. The coupling socket section 44 includes a counterbore 50 which receives the tubular member outer end 34.

Coupling means 52 is provided for mounting the filter assembly 24 on the container sidewall means 16 and includes the coupling 42, female-threaded locking ring 53, and nut 55, each threadably received on the coupling male-threaded section 46, and an elastomeric, annular gasket ring 54 receiving the coupling male-threaded section 46 and engaging the container sidewall means 16. The coupling socket section 44 is slightly enlarged with respect to the coupling male-threaded section 46, forming an annular coupling shoulder 56 therebetween against which the gasket ring 54 impinges.

The filter assembly 24 can be relatively securely mounted on the container sidewall means 16 with the coupling male-threaded section 46 extending through the sidewall means opening 20. Locking ring 53 can then be screwed onto the coupling male-threaded section 46, and into clamping engagement with the gasket ring 54. The gasket ring 54 can thereby be clamped between the coupling shoulder 56 and the sidewall means interior surface 17 for providing a relatively watertight seal between the sidewall means 16 and the filter assembly 24. Nut 55 can then be screwed onto threaded section 46 adjacent locking ring 53 to provide a finished appearance. With the filter assembly 24 installed on the container body 12, the tubular member openings 37 can be oriented in various directions, although orienting them downwardly can have advantages for certain applications. The water level can be adjusted by manually rotating filter assembly 24 and thus changing the height of tubular member openings 37.

A filter screen 60 is wrapped in multiple layers around the tubular member 40 between the tubular member ends 42, 44. The screen 60 can comprise various fabric-like, fluid-porous materials with suitable characteristics of porosity and suitability for use in a damp, earthen environment. The screen 60 can be secured at each end by annular clamping bands 64 or by any other suitable means, such as, e.g., C-clamps, hose clamps, etc. Exemplary materials for the screen 60 include fabric designed for blocking weed growth and woven fiberglass screen cloth. Such materials include integral passage means which pass water therethrough while retaining solids and particulates of certain sizes.

IV. Operation

In operation, the filter assembly 24 can be installed on planter containers of various sizes and configurations, either singly or in multiples. The sidewall opening 22 can be positioned in relatively close proximity to the container bottom wall 14, thus positioning the screen 60 in relatively closely-spaced relation above the bottom wall 14. The vertical placement of the opening 22 and the filter assembly 24 can be used to establish and control a predetermined water level (not shown) in the container receptacle 20. Advantageously, filter assembly 24 can be manually rotated upwardly in the general direction of rim 18, or downwardly toward bottom wall 14 as shown in phantom in FIG. 6 to respectively raise or lower the drainage level in the planter. Such rotation can be accomplished either before the planter is filled with soil and plants, or afterwards, by inserting a finger, or object such as a pencil into the soil above or below drain 24 and pushing or pulling on the tubular member 30, causing elbow 38 to rotate until tube openings 37 are positioned at a height to achieve the desired drainage level.

Excessive moisture in the container receptacle 20 will be drained from the planter by drain assembly 24. The drain assembly 24 effectively provides a two-stage filtering system, with the screen 60 filtering out and blocking the flow of relatively fine particulate matter and solids, e.g., potting soil 66, and the tubular member openings 37 providing a second filtering stage for controlling the flow of water through the filter assembly 24. For example, tubular member 30 can be mounted in the container sidewall 16 with the openings 37 thereof oriented radially downwardly, whereby only water forced upwardly, e.g., by hydrostatic pressure, will be admitted into the tubular member 30 for drainage. Thus, potting soil 66 and other particulate matter could compact on top of the filter assembly 24, and the downwardly-oriented tubular member openings 37 would still admit water for drainage.

The fluid dynamics and hydraulic flow characteristics of the planter 10 can be varied and controlled by adjusting various characteristics of the filter assembly 24, its mounting in the container body 12, vertical position within container 20, and the number of filter assemblies 24 provided. In particular, such factors include the sizes of the filter assembly 24 and its various components, the sizes of the passages through the screen 60, the sizes and numbers of the tubular member openings 37 and the number of screen windings formed by wrapping the tubular member 30 with the screen 60.

It is to be understood that while certain forms of the present invention have been illustrated and described herein, it is not to be limited to the specific forms or arrangement of parts described and shown.

What is claimed and desired to be secured by Letters Patent is as follows:

1. A self-draining planter, comprising:
   (a) structure having walls defining an upwardly open soil, plant, and water-holding receptacle, at least one of said walls defining a water-flow aperture;
   (b) drain means coupled with said aperture and extending inwardly therefrom into said compartment for conducting water outwardly through said aperture;
   (c) filter means coupled with said drain means for selective removal of water from said receptacle; and
   (d) means adjustably supporting said drain means within said receptacle in disposition such that water is drained to a preselected level within the receptacle.

2. The invention as set forth in claim 1, wherein said drain means includes a generally L-shaped hollow tubular member having a pair of opposed ends and a wall including an opening therein.

3. The invention as set forth in claim 2, wherein said wall includes multiple openings therein and said inward tubular end is closed.

4. The invention as set forth in claim 2, wherein said filter means includes screen means generally surrounding said tubular member and including fluid passage means fluidically communicating with said tubular member opening.

5. The invention as set forth in claim 4, wherein said screen means comprises multiple layers of a flexible material wrapped around said pipe member in multiple turns.

6. The invention as set forth in claim 1, wherein said support means includes a hollow threaded section extending through said aperture and a nut threadably received on said section.

7. The invention as set forth in claim 6, wherein:
   (a) said walls include inner and outer surfaces; and
   (b) said support means includes an annular gasket ring engaging said planter wall inner surface and an annular locking ring engaging said planter wall outer surface, said rings cooperatively engaging said wall therebetween.

8. The invention as set forth in claim 4, wherein said screen means comprises woven fiberglass cloth.

9. The invention as set forth in claim 4 wherein said filter means comprises porous cloth.

10. A filtering drain for a planter having walls, comprising:
    (a) a generally L-shaped hollow tubular member having a pair of opposed ends and a wall defining a water-conducting bore extending therebetween;
    (b) spaced water-conducting openings in said wall communicating with said bore;
    (c) filter means enclosing said openings for selective filtration of water into said bore; and
    (d) adjustable coupling means for coupling said drain in supporting relationship within said planter in disposition such that water is drained to a preselected level within the planter.

11. A self-draining planter, which comprises:
    (a) structure having walls defining an upwardly open soil, plant, and water-holding receptacle having inner and outer surfaces, at least one of said walls defining a water-flow aperture; and
    (b) a filter assembly including:
        (1) a generally L-shaped hollow tubular member having a pair of opposed ends and a wall defining a water-conducting bore extending therebetween,
        (2) a plurality of spaced water-conducting openings in said wall in fluidic communication with said bore,
        (3) an endcap mounted on and closing the innermost end of said tubular member,
        (4) a coupling including a hollow threaded section extending through said aperture, a nut threadably received on said section, an annular gasket ring engaging said planter wall inner surface and an annular locking ring engaging said planter wall outer surface, said rings cooperatively engaging said wall therebetween for supporting said L-shaped member in disposition such that water is drained to a preselected level within the planter,
        (5) a multiple-layer fabric screen enclosing said water-conducting openings, said fabric screen including water passages.

* * * * *